(No Model.)

J. O. HINER.
VEHICLE WHEEL.

No. 501,420. Patented July 11, 1893.

WITNESSES
Jesse Heller.
Philip C. Masi.

INVENTOR
James O. Hiner
by E. W. Anderson
his Attorney

UNITED STATES PATENT OFFICE.

JAMES O. HINER, OF MONTEREY, VIRGINIA.

VEHICLE-WHEEL.

SPECIFICATION forming part of Letters Patent No. 501,420, dated July 11, 1893.

Application filed March 11, 1893. Serial No. 465,530. (No model.)

*To all whom it may concern:*

Be it known that I, JAMES O. HINER, a citizen of the United States, and a resident of Monterey, in the county of Highland and State of Virginia, have invented certain new and useful Improvements in Vehicle-Wheels; and I do declare the following to be a full, clear, and exact description of the invention, such as will enable others skilled in the art to which it appertains to make and use the same, reference being had to the accompanying drawings, and to the letters of reference marked thereon, which form a part of this specification.

Figure 1:
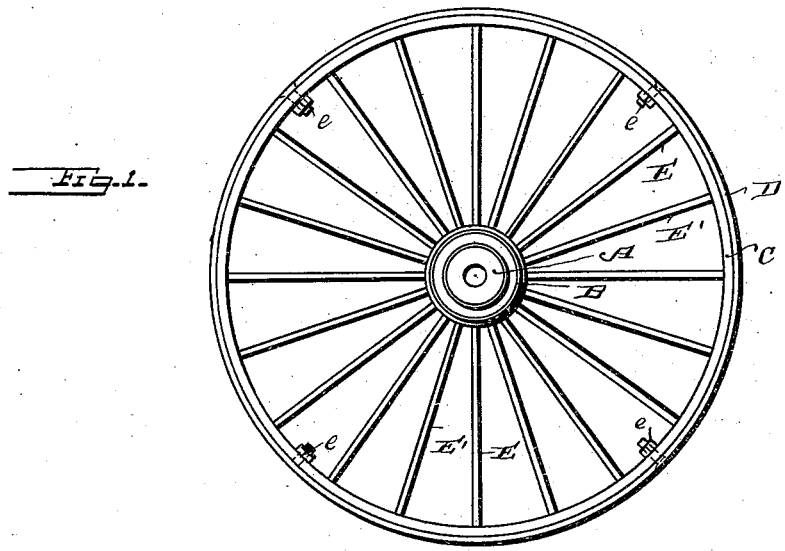
Figure 2:
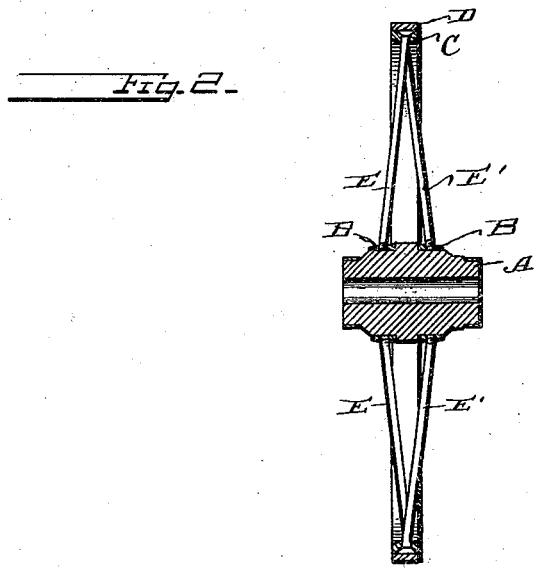

Figure 1 of the drawings is a side view of the wheel and Fig. 2 is a vertical transverse section of same.

This invention has relation to certain new and useful improvements in vehicle wheels, and it consists in the novel construction and combination of parts, all as hereinafter described and pointed out in the accompanying claim.

Referring to the accompanying drawings, the letter A designates the hub of my improved wheel, said hub to be made of wood, and provided near each end with a band B of malleable iron. These bands are to be made quite heavy at their inner edges, decreasing in thickness toward the outer edges.

C designates the felly, which is to be made of iron in one piece, and D is the tire, of common form, which is secured to said felly by means of bolts or rivets *e*.

E, E', designate the spokes, which consist of steel rods, and which are arranged in two series, one series extending from each of the bands B to the felly, and alternating with the other series. The inner ends of said spokes are screwed into threaded sockets in the bands B, B, while their outer ends extend through countersunk perforations in the felly, and are secured at the outer face of said felly by upsetting or riveting their ends in the countersinks. A wheel of this character is strong and durable, can be cheaply made and repaired, and is neat and attractive in appearance. Furthermore, there is no danger of the wheel becoming dished or sprung, or of the tire getting loose. The tire may be worn entirely out, and hence does not require to be heavy, as the wheel may be run after the tire is off.

Having described this invention, what I claim, and desire to secure by Letters Patent, is—

The herein described vehicle wheel, comprising a hub, broad metallic bands B on said hub one near each end thereof said bands being thicker at the inner than at the outer portions, threaded sockets in said bands, a metallic felly, and a double series of spokes, one series extending from each of the said bands to the felly, and secured by screwing their inner ends into said sockets, and by upsetting their outer ends in countersunk perforations in the felly, substantially as specified.

In testimony whereof I affix my signature in presence of two witnesses.

J. O. HINER.

Witnesses:
J. H. HIDY,
S. W. CRUMMETT.